United States Patent
Liu et al.

(10) Patent No.: US 11,692,749 B2
(45) Date of Patent: Jul. 4, 2023

(54) REFRIGERATION APPLIANCE AND METHOD FOR OPERATING THE REFRIGERATION APPLIANCE

(71) Applicant: BSH Hausgeraete GmbH, Munich (DE)

(72) Inventors: Xiangyu Liu, Nanjing (CN); Guike Shen, Nanjing (CN); Baoyang Wang, Nanjing (CN); Qiwu Zhu, Anhui (CN); Weizhong Zhu, Chuzhou (CN)

(73) Assignee: BSH Hausgeraete GmbH, Munich (DE)

( * ) Notice: Subject to any disclaimer, the term of this patent is extended or adjusted under 35 U.S.C. 154(b) by 114 days.

(21) Appl. No.: 17/113,212

(22) Filed: Dec. 7, 2020

(65) Prior Publication Data

US 2021/0172658 A1    Jun. 10, 2021

(30) Foreign Application Priority Data

Dec. 5, 2019    (CN) .......................... 201911232023.4

(51) Int. Cl.
*F25B 41/22* (2021.01)
*F25B 13/00* (2006.01)

(52) U.S. Cl.
CPC .............. *F25B 41/22* (2021.01); *F25B 13/00* (2013.01); *F25B 2700/2104* (2013.01)

(58) Field of Classification Search
CPC ................ F25B 2600/2515; F25B 5/02; F25B 2600/0251; F25B 41/22; F25B 13/00; F25B 2700/2104
See application file for complete search history.

(56) References Cited

U.S. PATENT DOCUMENTS

| | | | | |
|---|---|---|---|---|
| 4,987,747 A | * | 1/1991 | Nakamura | F24F 3/065 62/278 |
| 6,266,968 B1 | * | 7/2001 | Redlich | F25B 49/02 62/526 |
| 2016/0054041 A1 | * | 2/2016 | Choi | F25D 11/006 62/236 |
| 2019/0212042 A1 | * | 7/2019 | Yamada | F25B 41/39 |
| 2019/0338986 A1 | * | 11/2019 | Yamada | F25B 49/02 |

* cited by examiner

*Primary Examiner* — Henry T Crenshaw
(74) *Attorney, Agent, or Firm* — Laurence A. Greenberg; Werner H. Stemer; Ralph E. Locher

(57) ABSTRACT

A method for operating a refrigeration appliance includes the steps of running a compressor and opening at least one of a first branch and a second branch, where the first branch has a first evaporator, the second branch has a second evaporator, and the first branch and the second branch are connected in parallel at inlets thereof. The method further determines, according to an ambient temperature, whether the first branch is open after the compressor is turned off and determines, based on the ambient temperature, whether the second branch is open after the compressor is turned off.

12 Claims, 5 Drawing Sheets

REFRIGERATION APPLIANCE AND METHOD FOR OPERATING THE REFRIGERATION APPLIANCE

CROSS-REFERENCE TO RELATED APPLICATION

This application claims the priority, under 35 U.S.C. § 119, of Chinese patent application CN 201911232023.4, filed Dec. 5, 2019; the prior application is herewith incorporated by reference in its entirety.

BACKGROUND OF THE INVENTION

Field of the Invention

Embodiments of the present invention relate to a refrigeration appliance and a method for operating the refrigeration appliance.

A compressor of the refrigeration appliance is generally started when a startup condition is reached and stops working when a stop condition is reached. For example, when at least one storage room has a cooling request, the compressor is started to refrigerate the storage room, and when cooling requests of all storage rooms are satisfied, the compressor is turned off. For a refrigeration system including at least two refrigeration cycles, opening and closing of each refrigeration cycle is generally controlled by using a fluid control unit such as a reversing valve, a stop valve, or a rotary valve, to selectively run a corresponding refrigeration cycle to cool a corresponding storage room.

BRIEF SUMMARY OF THE INVENTION

An objective of embodiments of the present invention is to provide a method for a refrigeration appliance and a refrigeration appliance.

Therefore, an aspect of the embodiments of the present invention relates to a method for a refrigeration appliance, including: running a compressor to supply at least one of a plurality of branches connected in parallel at inlets thereof with a refrigerant, where each branch has a corresponding evaporator; and determining, based on an ambient temperature, whether at least one branch is open after the compressor is turned off.

Optionally, the branch may include a first branch for cooling a first storage room that is a freezer, and whether the first branch is open after the compressor is turned off is determined based on the ambient temperature.

Optionally, the branch may include a second branch for cooling a second storage room that includes a non-freezing temperature zone, and whether the second branch is open after the compressor is turned off is determined based on the ambient temperature.

Optionally, a first ambient temperature range in which the first branch is closed after the compressor is turned off is wider than a second ambient temperature range in which the second branch is closed after the compressor is turned off, or a first ambient temperature range in which the first branch is closed after the compressor is turned off is the same as a second ambient temperature range in which the second branch is closed after the compressor is turned off.

Optionally, when the ambient temperature is less than 20 degrees centigrade, if the ambient temperature is less than a lower limit of the first ambient temperature range, the first branch is open after the compressor is turned off, and if the ambient temperature is less than a lower limit of the second ambient temperature range, the second branch is open after the compressor is turned off, where the lower limit of the first ambient temperature range is less than or equal to the lower limit of the second ambient temperature range. When the ambient temperature is greater than 20 degrees centigrade, if the ambient temperature is greater than an upper limit of the first ambient temperature range, the first branch is open after the compressor is turned off, and if the ambient temperature is greater than an upper limit of the second ambient temperature range, the second branch is open after the compressor is turned off, where the upper limit of the first ambient temperature range is greater than or equal to the upper limit of the second ambient temperature range.

Another aspect of the embodiments of the present invention relates to a method for a refrigeration appliance, including: running a compressor; opening at least one of a first branch and a second branch, where the first branch has a first evaporator, the second branch has a second evaporator, and the first branch and the second branch are connected in parallel at inlets thereof; determining, based on an ambient temperature, whether the first branch is open after the compressor is turned off; and/or determining, based on the ambient temperature, whether the second branch is open after the compressor is turned off.

Optionally, when the ambient temperature is within the first ambient temperature range, the first branch is closed after the compressor is turned off. When the ambient temperature is outside of the first ambient temperature range, the first branch is open after the compressor is turned off.

It should be understood that the first ambient temperature range and the second ambient temperature range may be continuous respectively or include at least two separate subranges.

Optionally, the first ambient temperature range includes a lower limit that is less than 20 degrees centigrade and/or an upper limit that is greater than 20 degrees centigrade.

Optionally, when the ambient temperature is within the second ambient temperature range, the second branch is closed after the compressor is turned off, and when the ambient temperature is outside of the second ambient temperature range, the second branch is open after the compressor is turned off.

Optionally, the second ambient temperature range includes a lower limit that is less than 20 degrees centigrade and/or an upper limit that is greater than 20 degrees centigrade.

Still another aspect of the embodiments of the present invention relates to a refrigeration appliance. The refrigeration appliance includes a compressor, a plurality of branches connected in parallel at inlets thereof, where each branch has a corresponding evaporator, and a fluid control unit, configured to selectively open at least one of the branches, so that when the compressor is running, a corresponding evaporator in the opened branch is supplied with a refrigerant output from the compressor. The refrigeration appliance further has a control unit, where the control unit is configured to determine, based on an ambient temperature, whether at least one of the branches is open after the compressor is turned off.

Optionally, the branch includes a first branch, and whether the first branch is open after the compressor is turned off is determined based on the ambient temperature.

Optionally, the branch includes a second branch, and whether the second branch is open after the compressor is turned off is determined based on the ambient temperature.

Optionally, the control unit is configured to determine, based on the ambient temperature, whether all the branches are open after the compressor is turned off.

Optionally, the control unit is configured to determine, based on the ambient temperature, whether all the branches are open after the compressor is turned off.

Still another aspect of the embodiments of the present invention relates to a refrigeration appliance, including a compressor, a first branch, which has a first evaporator, and a second branch, which has a second evaporator. Wherein an inlet of the first branch and an inlet of the second branch are connected in parallel. When the compressor is running and the first branch is open, the first evaporator is supplied with a refrigerant output from the compressor, and when the compressor is running and the second branch is open, the second evaporator is supplied with a refrigerant output from the compressor. A control unit is provided, where the control unit is coupled to the compressor. The control unit is configured to determine, based on an ambient temperature, whether the first branch is open after the compressor is turned off, and/or the control unit is configured to determine, based on the ambient temperature, whether the second branch is open after the compressor is turned off.

Optionally, when the ambient temperature is within the first ambient temperature range, the first branch is closed after the compressor is turned off. When the ambient temperature is outside of the first ambient temperature range, the first branch is open after the compressor is turned off.

Optionally, the first ambient temperature range includes a lower limit that is less than 20 degrees centigrade and/or an upper limit that is greater than 20 degrees centigrade.

Optionally, when the ambient temperature is within the second ambient temperature range, the second branch is closed after the compressor is turned off, and when the ambient temperature is outside of the second ambient temperature range, the second branch is open after the compressor is turned off.

Optionally, the second ambient temperature range includes a lower limit that is less than 20 degrees centigrade and/or an upper limit that is greater than 20 degrees centigrade.

Optionally, the first evaporator is configured to cool a first storage room that is a freezer, the second evaporator is configured to cool a second storage room that includes a non-freezing temperature zone, and the first ambient temperature range in which the first branch is closed after the compressor is turned off is wider than or equal to the second ambient temperature range in which the second branch is closed after the compressor is turned off.

Optionally, the second ambient temperature range is within the first ambient temperature range.

Optionally, when the ambient temperature is less than 20 degrees centigrade, if the ambient temperature is less than a lower limit of the first ambient temperature range, the first branch is open after the compressor is turned off, and if the ambient temperature is less than a lower limit of the second ambient temperature range, the second branch is open after the compressor is turned off, where the lower limit of the first ambient temperature range is less than or equal to the lower limit of the second ambient temperature range. When the ambient temperature is greater than 20 degrees centigrade, if the ambient temperature is greater than an upper limit of the first ambient temperature range, the first branch is open after the compressor is turned off, and if the ambient temperature is greater than an upper limit of the second ambient temperature range, the second branch is open after the compressor is turned off, where the upper limit of the first ambient temperature range is greater than or equal to the upper limit of the second ambient temperature range.

Optionally, the fluid control unit includes a first valve located between the inlet of the first branch and the first evaporator and a second valve located between the inlet of the second branch and the second evaporator.

Optionally, the fluid control unit includes a rotary valve, where the rotary valve includes a first outlet coupled to the first branch and a second outlet coupled to the second branch.

According to the embodiments of the present invention, whether at least one branch is closed may be determined based on the ambient temperature, thereby helping to obtain a better balance between reliability and energy efficiency of a refrigeration system.

Other features which are considered as characteristic for the invention are set forth in the appended claims.

Although the invention is illustrated and described herein as embodied in a refrigeration appliance and a method for a refrigeration appliance, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 6-1 is a schematic diagram of temperature division of an ambient temperature according to an embodiment of the present invention;

FIG. 6-2 is a schematic diagram of temperature division of an ambient temperature according to another embodiment of the present invention;

FIG. 6-3 is a schematic diagram of temperature division of an ambient temperature according to still another embodiment of the present invention;

FIG. 6-4 is a schematic diagram of temperature division of an ambient temperature according to still another embodiment of the present invention;

FIG. 7-1 is a schematic diagram of statuses of a compressor, a first branch, and a second branch when an ambient temperature is within a first ambient temperature range and a second ambient temperature range according to an embodiment of the present invention; and FIG. 7-2 is a schematic diagram of statuses of the compressor, the first branch, and the second branch when an ambient temperature is outside of a first ambient temperature range and a second ambient temperature range according to an embodiment of the present invention.

DETAILED DESCRIPTION OF THE INVENTION

An aspect of embodiments of the present invention relates to a method for operating a refrigeration appliance, which includes: running a compressor to supply at least one of a plurality of branches connected in parallel at inlets thereof with a refrigerant, where each branch has a corresponding evaporator; and determining, based on an ambient temperature, whether at least one branch is open after the compressor is turned off.

Another aspect of embodiments of the present invention relates to a refrigeration appliance. The refrigeration appliance includes a compressor, a plurality of branches connected in parallel at inlets thereof, where each branch has a corresponding evaporator and a fluid control unit, configured to selectively open at least one of the branches, so that when the compressor is running, a corresponding evaporator in the opened branch is supplied with a refrigerant output from the compressor. A control unit is provided where the control unit is configured to determine, based on an ambient temperature, whether at least one of the branches is open after the compressor is turned off.

The branches may include at least two branches including corresponding evaporators.

In some embodiments, the branch may include a first branch for cooling a freezer, and the method for a refrigeration appliance may include determining, based on an ambient temperature, whether the first branch is open after the compressor is turned off.

In some embodiments, the branch may include a second branch for cooling a second storage room that includes a non-freezing temperature zone, and whether the second branch is open after the compressor is turned off is determined based on the ambient temperature.

Embodiments of the present invention are described below in detail with reference to the accompanying drawings.

Figure 1:
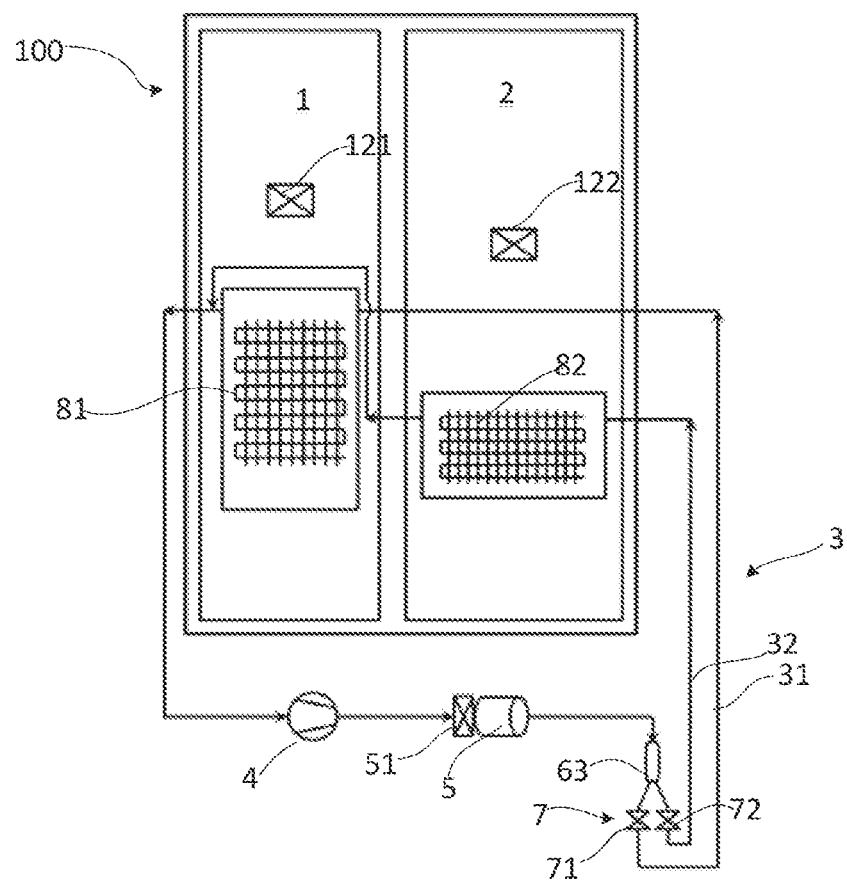
FIG. 1 is a schematic diagram of a refrigeration appliance according to an embodiment of the present invention.

Referring now to the figures of the drawings in detail and first, particularly to FIG. 1 thereof, there is shown a schematic diagram of a refrigeration appliance 100 according to an embodiment of the present invention. As shown in FIG. 1, the refrigeration appliance 100 includes a first storage room 1 and a second storage room 2.

The first storage room 1 and the second storage room 2 are thermally isolated. The first storage room 1 and the second storage room 2 may be disposed adjacent to each other or separated by another storage room.

The refrigeration appliance 100 includes a refrigeration system 3 for cooling the first storage room 1 and the second storage room 2. In an exemplary embodiment, the refrigeration system 3 includes a compressor 4, a condenser 5, an expansion device (not shown in FIG. 1), a fluid control unit 7, a first evaporator 81, and a second evaporator 82 that are connected through a pipeline transporting a refrigerant. The first evaporator 81 is configured to cool the first storage room 1, and the second evaporator 82 is configured to cool the second storage room 2.

A flow direction of the refrigerant is exemplarily shown by arrows on the pipeline connecting the components in FIG. 1. The refrigerant may flow to a first branch 31 and a second branch 32 connected in parallel at inlets thereof through the condenser 5 after output from the compressor 4. The first branch 31 includes the first evaporator 81, and the second branch 32 includes the second evaporator 82. In this way, a parallel double-cycle refrigeration system is formed.

In an exemplary embodiment, a set temperature of the second storage room 2 is higher than that of the first storage room 1. Evaporating pressure of the second storage room 2 is higher than evaporating pressure of the first storage room 1.

For example, the first storage room 1 is a freezer, and the second storage room 2 is a storage room including a non-freezing temperature zone. For example, a set temperature range of the second storage room 2 may be any range selected from −4 degrees to 12 degrees, such as 2 degrees centigrade to 8 degrees centigrade, 2 degrees centigrade to 12 degrees centigrade, −2 degrees centigrade to 2 degrees centigrade, −4 degrees centigrade to 4 degrees centigrade, or 0 degrees centigrade to 2 degrees centigrade.

The fluid control unit 7 is configured to selectively supply the refrigerant output from the condenser 5 to the first branch 31 and/or the second branch 32. The fluid control unit 7 is located at the downstream of the condenser 5.

A dryer 63 may be disposed between the fluid control unit 7 and the condenser 5. In this embodiment, the first branch 31 and the second branch 32 are connected in parallel at the dryer 63.

Such setting of the fluid control unit 7 enables the first branch 31 and the second branch 32 be open or closed independently. For example, the first branch 31 may be open or closed regardless of whether the second branch 32 is open, and vice versa.

The fluid control unit 7 may include a first stop valve 71 located at the first branch 31 for controlling opening and closing of the first branch 31. When the first stop valve 71 opens the first branch 31, the refrigerant output from the compressor 4 may be supplied to the first evaporator 81 of the first branch 31, to cool the first storage room 1 corresponding to the first evaporator 81. The first stop valve 71 is located between the dryer 63 and the first evaporator 81.

The fluid control unit 7 may include a second stop valve 72 located at the second branch 32 for controlling the second branch 32. When the second stop valve 72 opens the second branch 32, the refrigerant output from the compressor 4 may be supplied to the second evaporator 82 located at the second branch 32, to cool the second storage room 2 corresponding to the second evaporator 82. The second stop valve 72 is located between the dryer 63 and the second evaporator 82.

The refrigeration appliance 100 may include a first fan 121 for the first storage room 1 and a second fan 122 for the second storage room 2. When the first storage room 1 is cooled, the first fan 121 works. When the second storage room 2 is cooled, the second fan 122 works.

The refrigeration appliance 100 may include a third fan 51 disposed adjacent to the condenser 5 for improving heat dissipation efficiency of the condenser 5.

Figure 2:
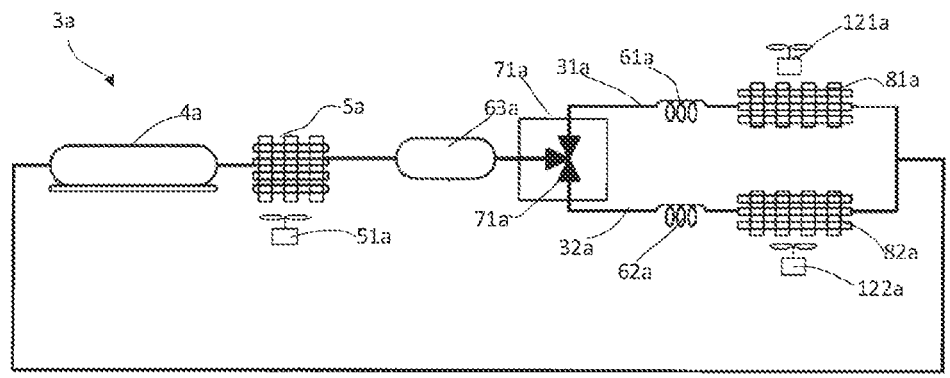
FIG. 2 is a schematic diagram of a refrigeration system of the refrigeration appliance according to another embodiment of the present invention.

FIG. 2 is a refrigeration system 3a for the refrigeration appliance 100 according to another embodiment of the present invention. A main difference between the refrigeration system 3a and the refrigeration system 3 shown in FIG. 1 lies in the fluid control unit.

As shown in FIG. 2, the refrigeration system 3a includes a compressor 4a, a condenser 5a, a dryer 63a, a fluid control unit 7a, and a first evaporator 81a and a second evaporator 82a located at the downstream of the fluid control unit 7a. A first expansion device 61a may be disposed between the first evaporator 81a and the fluid control unit 7a, and a second expansion device 62a is disposed between the second evaporator 82a and the fluid control unit 7a.

The refrigeration system 3a may include a first fan 121a for the first storage room 1 and a second fan 122a for the second storage room 2. The refrigeration system 3a may include a third fan 51a disposed adjacent to the condenser 5a for improving heat dissipation efficiency of the condenser 5a.

The fluid control unit 7a includes a rotary valve 71a. The rotary valve 71a includes a first outlet in communication with the first branch 31a and a second outlet in communication with the second branch 32a. The first branch 31a and the second branch 32a are connected in parallel through the rotary valve 71a.

The rotary valve 71a may include a stepmotor, to determine the opening and closing of the first outlet and the second outlet according to a position of the stepmotor. Four cases that only the first outlet is open, only the second outlet is open, both the first outlet and the second outlet are open, and both the first outlet and the second outlet are closed may be implemented by controlling the stepmotor of the rotary valve 71a.

When only the first outlet is open, a refrigerant output from the compressor 4a may flow to the first branch 31a after passing through the condenser 5a and be supplied to the first evaporator 81a. The refrigerant is evaporated in the first evaporator 81a, and the first storage room 1 is cooled.

When only the second outlet is open, the refrigerant output from the compressor 4a may flow to the second branch 32a and be supplied to the second evaporator 82a. The refrigerant is evaporated in the second evaporator 82a, and the second storage room 2 is cooled.

When both the first outlet and the second outlet are open, the refrigerant output from the compressor 4a may concurrently flow to the first branch 31a to be supplied to the first evaporator 81a and flow to the second branch 32a to be supplied to the second evaporator 82a. The refrigerant is evaporated in the first evaporator 81a and the second evaporator 82a respectively, and the first storage room 1 and the second storage room 2 may be cooled at the same time.

Figure 3:
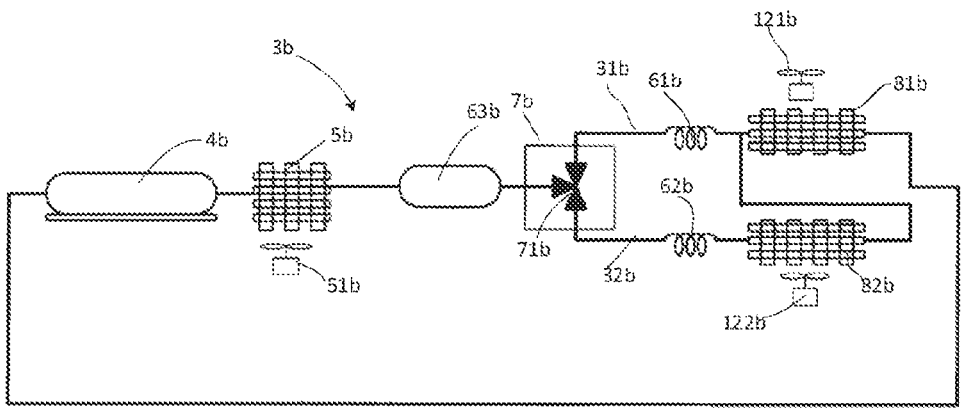
FIG. 3 is a schematic diagram of the refrigeration system of the refrigeration appliance according to still another embodiment of the present invention.

FIG. 3 is a refrigeration system 3b for the refrigeration appliance 100 according to another embodiment of the present invention. As shown in FIG. 3, the refrigeration system 3b includes a compressor 4b, a condenser 5b, a dryer 63b, a fluid control unit 7b, and a first evaporator 81b and a second evaporator 82b located at the downstream of the fluid control unit 7b. The first evaporator 81b is configured to cool the first storage room 1, and the second evaporator 82b is configured to cool the second storage room 2.

A first expansion device 61b may be disposed between an entrance end of the first evaporator 81b and an exit end of the fluid control unit 7b, and a second expansion device 62b is disposed between an entrance end of the second evaporator 82b and the exit end of the fluid control unit 7b.

The fluid control unit 7b may have a same structure as the fluid control unit 7a, and details are not described herein again.

The refrigeration system 3b may include a first fan 121b for the first storage room 1 and a second fan 122b for the second storage room 2. The refrigeration system 3b may further include a third fan 51b disposed adjacent to the condenser 5b for improving heat dissipation efficiency of the condenser 5b.

Different from the embodiment in FIG. 2, in the embodiment shown in FIG. 3, a refrigerant output from the second evaporator 82b returns to the compressor 4b through the first evaporator 81b, which is beneficial to improving refrigeration efficiency of the refrigeration system. This advantage becomes especially obvious when the first evaporator 81b cools a freezer and the second evaporator 82b cools a refrigeration temperature zone.

When the refrigerant is only supplied to the first branch 31b of the first branch 31b and the second branch 32b by controlling the fluid control unit 7b, the refrigerant is evaporated in the first evaporator 81b to cool the first storage room 1.

When the refrigerant is only supplied to the second branch 32b of the first branch 31b and the second branch 32b, the second storage room 2 is cooled. Sometimes, the refrigerant that is not completely evaporated and output from the second evaporator 32b may be evaporated in the first evaporator 81b to improve the efficiency of the refrigeration system 3b.

When the rotary valve 71b opens the first branch 31b and the second branch 32b at the same time to supply the refrigerant to both of the first branch 31b and the second branch 32b at the same time, the first storage room 1 and the second storage room 2 are cooled at the same time.

Figure 4:
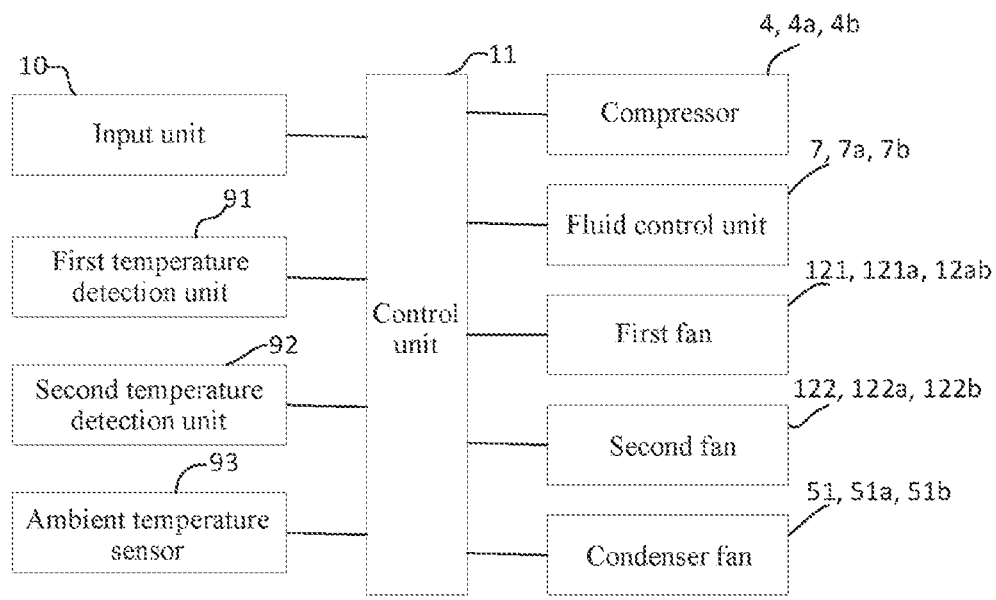
FIG. 4 is a block system diagram of the refrigeration appliance according to an embodiment of the present invention.
Figure 5:
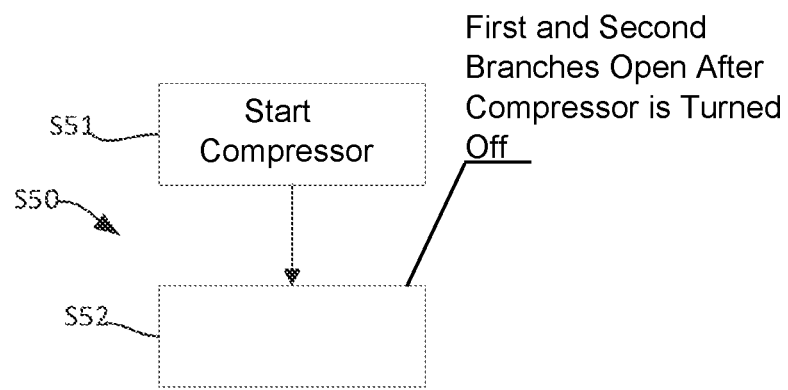
FIG. 5 is a flow chart describing a method for operating a refrigeration appliance according to an embodiment of the present invention.

Referring to FIG. 4 in combination with FIG. 1 to FIG. 3, the refrigeration appliance 100 may include a first temperature detection unit 91 for detecting a temperature of the first storage room 1 and a second temperature detection unit 92 for detecting a temperature of the second storage room 2. The first temperature detection unit 91 and the second temperature detection unit 92 may respectively include at least one temperature sensor.

In an exemplary embodiment, the first temperature detection unit 91 and the second temperature detection unit 92 respectively include at least two temperature sensors. The temperatures of the first storage room 1 and the second storage room 2 may be respectively obtained through calculation by using the at least two temperature sensors.

The refrigeration appliance 100 may include an input unit 10 for receiving user input. The input unit 10 may receive a set temperature Tset1 of a user for the first storage room 1 and a set temperature Tset1 of the user for the second storage room 2. Generally, a set temperature Tset1 of a storage room is an expected temperature of the user for the storage room.

In an exemplary embodiment, at least a part of the input unit 10 and/or a control unit 11 may be disposed on a main body 101 of the refrigeration appliance 100 and/or a door (not shown in the figure) for closing the storage room.

In another embodiment, at least a part of the input unit 10 and/or the control unit 11 of the refrigeration appliance 100 is disposed in a remote device independent of and outside of the main body 101/the door of the refrigeration appliance. For example, the user may set the set temperatures of the first storage room 1 and the second storage room 2 through a remote terminal. In another example, temperature information obtained by the temperature detection unit disposed on the main body 101 is transmitted to the control unit 11 located at a remote server, and the refrigeration system 3, 3a, 3b is controlled based on instructions of the remote control unit 11.

An environment parameter such as an ambient temperature and/or an ambient humidity may also be used as an input parameter of the control unit 11 for controlling the refrigeration system 3. The refrigeration appliance 100 may include an ambient temperature sensor 93 for detecting a temperature of an environment in which the refrigeration appliance 100 is located. The refrigeration appliance 100 may include an ambient humidity sensor (not shown in the figure) for detecting a humidity of an environment in which the refrigeration appliance 100 is located.

The refrigeration appliance 100 includes a control unit 11. The control unit 11 is coupled to the first temperature detection unit 91, the second temperature detection unit 92, the ambient temperature sensor 93, the input unit 10, and the refrigeration system 3, 3a, 3b. According to feedback of the first temperature detection unit 91, the second temperature detection unit 92, and the ambient temperature sensor 93, the control unit 11 controls the compressor 4, 4a, 4b, the fluid control unit 7, 7a, 7b, the first fan 121, 121a, 121b, the second fan 122, 122a, 122b, and the third fan 51, 51a, 51b of the refrigeration system 3, 3a, 3b to work.

The control unit 11 may be configured to respectively determine, according to information of the first temperature detection unit 91 and the second temperature detection unit 92, whether the first storage room 1 and the second storage room 2 have a cooling request. An existing method may be used to determine whether a storage room has a cooling request. For example, in an embodiment, when a temperature of the first storage room 1 is greater than a startup temperature of the first storage room 1, it is determined that the first storage room 1 has a cooling request. When the temperature of the first storage room 1 reaches a stop temperature of the first storage room 1, the cooling request of the first storage room 1 is satisfied, and the refrigeration system 3, 3a, 3b may stop cooling the first storage room 1. A similar method may also be used for the second storage room 2. A startup temperature and a stop temperature of a storage room may be determined according to a set temperature thereof in combination with other parameters such as an ambient temperature.

According to an embodiment of the present invention, a method S50 for the refrigeration appliance 100 includes: S51, when at least one of the first storage room 1 and the second storage room 2 has a cooling request, starting the compressor 4, 4a, 4b to supply at least one of a first branch 31, 31a, 31b and a second branch 32, 32a, 32b connected in parallel at inlets thereof with a refrigerant; and S52, determining, based on an ambient temperature, whether the first branch 31, 31a, 31b is open after the compressor 4, 4a, 4b is turned off, and/or determining, based on the ambient temperature, whether the second branch 32, 32a, 32b is open after the compressor 4, 4a, 4b is turned off.

The control unit 11 may be configured to determine, according to ambient temperature information measured by the ambient temperature sensor 93, whether the first branch 31, 31a, 31b and/or the second branch 32, 32a, 32b are open after the compressor is turned off.

Opening or closing of the first branch 31, 31a, 31b and/or the second branch 32, 32a, 32b may be implemented by the fluid control unit 7, 7a, 7b.

In some embodiments, statuses of the first branch 31, 31a, 31b and the second branch 32, 32a, 32b after the compressor 4, 4a, 4b is turned off are related to the ambient temperature. Therefore, the step of whether to open at least one of the first branch 31, 31a, 31b and the second branch 32, 32a, 32b after the compressor 4, 4a, 4b is turned off is determined based on the ambient temperature may include: determining, based on the ambient temperature, whether to open the first branch 31, 31a, 31b and the second branch 32, 32a, 32b after the compressor 4, 4a, 4b is turned off.

For example, in some embodiments, when the ambient temperature is within a first ambient temperature range, the first branch 31, 31a, 31b is closed after the compressor 4, 4a, 4b is turned off. When the ambient temperature is outside of the first ambient temperature range, the first branch 31, 31a, 31b is open after the compressor 4, 4a, 4b is turned off. In another example, when the ambient temperature is within a second ambient temperature range, the second branch 32, 32a, 32b is closed after the compressor 4, 4a, 4b is turned off. When the ambient temperature is outside of the second ambient temperature range, the second branch 32, 32a, 32b is open after the compressor 4, 4a, 4b is turned off.

Figures 1, 7:
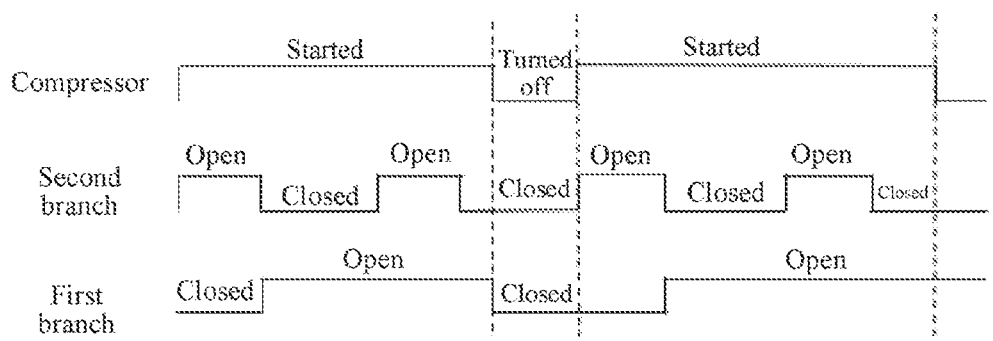
Figures 2, 7:
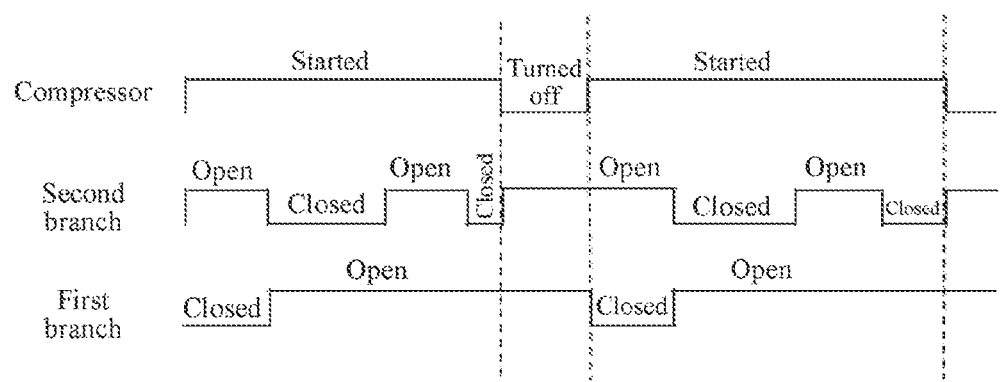

When the ambient temperature is within the first ambient temperature range and the second ambient temperature range, as shown in FIG. 7-1, the first branch 31, 31a, 31b and the second branch 32, 32a, 32b are closed after the compressor 4, 4a, 4b is turned off.

When the ambient temperature is outside of the first ambient temperature range and the second ambient temperature range, as shown in FIG. 7-2, the first branch 31, 31a, 31b and the second branch 32, 32a, 32b are open after the compressor 4, 4a, 4b is turned off.

The first ambient temperature range for determining whether the first branch 31, 31a, 31b is open after the compressor 4, 4a, 4b is turned off may be equal to the second ambient temperature range for determining whether the second branch 32, 32a, 32b is open after the compressor 4, 4a, 4b is turned off.

Figures 1, 6:
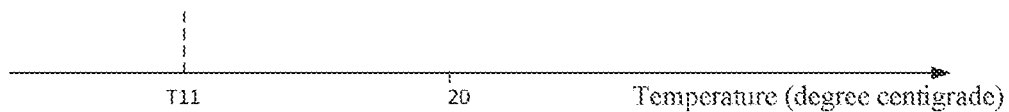
Figures 2, 6:
Figures 3, 6:
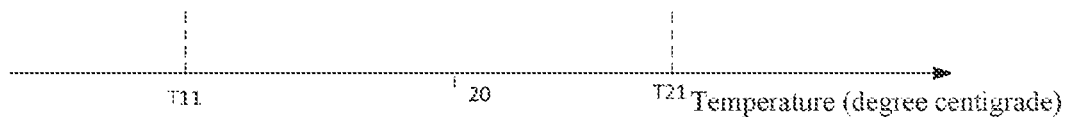
Figures 4, 6:
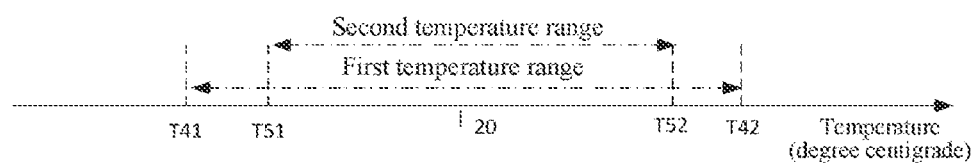

In some embodiments, as shown in FIG. 6-1, if the ambient temperature is greater than a first threshold T11, the first branch 31, 31a, 31b and the second branch 32, 32a, 32b are closed after the compressor 4, 4a, 4b is turned off.

If the ambient temperature is less than the first threshold T11, the first branch 31, 31a, 31b and the second branch 32, 32a, 32b are open after the compressor 4, 4a, 4b is turned off.

In some embodiments, the first threshold T11 may be less than 20 degrees centigrade. That is, the first ambient temperature range and the second ambient temperature range have a lower limit less than 20 degrees centigrade.

The first threshold T11 may be any value selected from 8 degrees centigrade to 15 degrees centigrade. Preferably, the first threshold T11 may be located between 10 degrees centigrade and 12 degrees centigrade.

For a frequency variable compressor 4, 4a, 4b, even the compressor is started at a low speed at a relatively low ambient temperature, since at least one cooling branch is open when the compressor is started, pressure difference in the refrigeration system 3, 3a, 3b is small, which is beneficial to safe start of the compressor.

In some embodiments, as shown in FIG. 6-2, if the ambient temperature is less than a second threshold T21, the first branch 31, 31a, 31b and the second branch 32, 32a, 32b are closed after the compressor 4, 4a, 4b is turned off. If the ambient temperature is greater than the second threshold T21, the first branch 31, 31a, 31b and the second branch 32, 32a, 32b are open after the compressor 4, 4a, 4b is turned off.

In some embodiments, the second threshold T21 may be greater than 20 degrees centigrade. That is, the first ambient temperature range and the second ambient temperature range may have upper limits greater than 20 degrees centigrade.

The second threshold T21 may be any value selected from 28 degrees centigrade to 37 degrees centigrade. Preferably, the second threshold T21 may be located between 30 degrees centigrade and 36 degrees centigrade.

Therefore, when the ambient temperature is high, after the compressor 4, 4a, 4b is turned off, at least one branch is open, thereby helping to balance the pressure difference between a high pressure side and a low pressure side in the refrigeration system 3, 3a, 3b. When the compressor 4, 4a, 4b is started again, a start resistance for the compressor can be reduced, which facilitates safe starting of the compressor.

In still some embodiments, as shown in FIG. 6-3, if the ambient temperature is between the first threshold T11 and the second threshold T21, the first branch 31, 31a, 31b and the second branch 32, 32a, 32b are closed after the compressor 4, 4a, 4b is turned off. If the ambient temperature is greater than the second threshold T21 or the ambient temperature is less than the first threshold T11, the first branch 31, 31a, 31b and the second branch 32, 32a, 32b are open after the compressor 4, 4a, 4b is turned off.

The first threshold T11 may be less than 20 degrees centigrade. The second threshold T21 may be greater than 20 degrees centigrade. Therefore, the first ambient temperature range and the second ambient temperature range respectively have a lower limit less than 20 degrees centigrade and an upper limit greater than 20 degrees centigrade.

The first threshold T11 may be any value selected from 8 degrees centigrade to 15 degrees centigrade. Preferably, the first threshold T11 may be located between 10 degrees centigrade and 12 degrees centigrade.

The second threshold T21 may be any value selected from 28 degrees centigrade to 37 degrees centigrade. Preferably, the second threshold T21 may be located between 30 degrees centigrade and 36 degrees centigrade.

Based on this, the ambient temperature is divided into three ranges: a low temperature range, an intermediate temperature range, and a high temperature range. When the measured ambient temperature is within the intermediate temperature range, after the compressor is turned off, the first branch and the second branch are closed. Because the intermediate temperature is a temperature section within which a majority of using conditions of a user fall, after the compressor is turned off, the pressure difference between the high pressure side and the low pressure side in the refrigeration system may be maintained by closing the first branch and the second branch, so that when the compressor is started again, no additional energy needs to be consumed to establish pressure difference, thereby helping to save energy. When the measured ambient temperature is within the low temperature range and the high temperature range, the reliability of the starting of the compressor may be improved by opening at least one branch.

In the embodiments described above, the first ambient temperature range for determining whether the first branch is open after the compressor 4, 4a, 4b is turned off is equal to the second ambient temperature range for determining whether the second branch is open after the compressor 4, 4a, 4b is turned off. In another embodiment, the first ambient temperature range for determining whether the first branch is open after the compressor 4, 4a, 4b is turned off may be different from the second ambient temperature range for determining whether the second branch is open after the compressor 4, 4a, 4b is turned off.

In some embodiments, the first ambient temperature range in which the first branch 31, 31a, 31b is open after the compressor is turned off may be defined based on any one of FIG. 6-1 to FIG. 6-3, and the second ambient temperature range in which the second branch 32, 32a, 32b is open after the compressor is turned off may be defined based on another of FIG. 6-1 to FIG. 6-3. For example, if the ambient temperature is less than the first threshold T11, one of the first branch 31, 31a, 31b and the second branch 32, 32a, 32b is open after the compressor is turned off, and if the ambient temperature is greater than the first threshold T11, the one of the first branch 31, 31a, 31b and the second branch 32, 32a, 32b is closed after the compressor is turned off. If the ambient temperature is greater than the second threshold T21, another of the first branch 31, 31a, 31b and the second branch 32, 32a, 32b is open after the compressor is turned off, and if the ambient temperature is less than the second threshold T21, the another of the first branch 31, 31a, 31b and the second branch 32, 32a, 32b is closed after the compressor is turned off.

In another example, if the ambient temperature is less than the first threshold T11 or the ambient temperature is greater than the second threshold T21, the first branch 31, 31a, 31b is open after the compressor is turned off. If the ambient temperature is between the first threshold T11 and the second threshold T21, the first branch 31, 31a, 31b is closed after the compressor is turned off. If the ambient temperature is greater than the second threshold T21, the second branch 32, 32a, 32b is open after the compressor is turned off, and if the ambient temperature is less than the second threshold T21, the second branch 32, 32a, 32b is closed after the compressor is turned off.

In some other embodiments, opening and closing of the first branch 31, 31a, 31b and the second branch 32, 32a, 32b may be both based on any temperature range in FIG. 6-1 to FIG. 6-3, but the two branches may have different thresholds.

Therefore, for example, when the ambient temperature is less than 20 degrees centigrade, if the ambient temperature is less than the first threshold, the first branch 31, 31a, 31b is open after the compressor 4, 4a, 4b is turned off, and if the ambient temperature is less than the second threshold, the second branch 32, 32a, 32b is open after the compressor 4, 4a, 4b is turned off, where the first threshold is less than the second threshold.

In another example, when the ambient temperature is greater than 20 degrees centigrade, if the ambient temperature is greater than a third threshold, the first branch 31, 31a, 31b is open after the compressor 4, 4a, 4b is turned off, and if the ambient temperature is greater than a fourth threshold, the second branch 32, 32a, 32b is open after the compressor 4, 4a, 4b is turned off, where the third threshold is greater than the fourth threshold.

As shown in FIG. 6-4, when the ambient temperature is between a first threshold T41 and a third threshold T42, the first branch 31, 31a, 31b is closed after the compressor 4, 4a, 4b is turned off. When the ambient temperature is outside of the first threshold T41 to the third threshold T42, the first branch 31, 31a, 31b is open after the compressor 4, 4a, 4b is turned off. If the ambient temperature is between a second threshold T51 and a fourth threshold T52, the second branch 32, 32a, 32b is closed after the compressor 4, 4a, 4b is turned off. If the ambient temperature is outside of the second threshold T51 to the fourth threshold T52, the second branch 32, 32a, 32b is open after the compressor 4, 4a, 4b is turned off. The first threshold T41 is less than the second threshold T51, or the third threshold T42 is greater than the fourth threshold T52.

Evaporation pressure of running of the second branch 32, 32a, 32b for cooling the second storage room 2 is higher than that of the first branch 31, 31a, 31b for cooling the first storage room 1, so that a starting load of the compressor 4, 4a, 4b is greater. If a greater temperature range for opening the second branch 32, 32a, 32b after the compressor is turned off is provided, it is beneficial to further improving the energy efficiency and reliability of the refrigeration system.

When the ambient temperature is between the first threshold T41 and the second threshold T51, the first branch 31, 31a, 31b is open after the compressor 4, 4a, 4b is turned off, and the second branch 32, 32a, 32b is open after the compressor 4, 4a, 4b is turned off.

When the ambient temperature is between the fourth threshold T52 and the third threshold T42, the first branch 31, 31a, 31b is closed after the compressor 4, 4a, 4b is turned off, and the second branch 32, 32a, 32b is open after the compressor 4, 4a, 4b is turned off.

Although in FIG. 6-4, the first threshold T41 used as the lower limit of the first ambient temperature range is less than the second threshold T51 used as the lower limit of the second ambient temperature range, and the third threshold T42 that is the upper limit of the first ambient temperature range is greater than the fourth threshold T52 that is the upper limit of the second ambient temperature range. In another embodiment, it is possible that the first threshold T41 is equal to the second threshold T51, or the third threshold T42 is equal to the fourth threshold T52.

In the foregoing embodiments, statuses of the first branch 31, 31a, 31b and the second branch 32, 32a, 32b after the compressor 4, 4a, 4b is turned off are both related to the ambient temperature. In another embodiment, there may be a case that a status of only one of the first branch 31, 31a, 31b and the second branch 32, 32a, 32b after the compressor 4, 4a, 4b is turned off is related to the ambient temperature.

For example, in an embodiment, determining whether to open the first branch 31, 31a, 31b after the compressor 4, 4a, 4b is turned off based on the ambient temperature. When the ambient temperature is within a preset temperature range, the first branch 31, 31a, 31b is closed after the compressor 4, 4a, 4b is turned off. When the ambient temperature is outside of the temperature range, the first branch 31, 31a, 31b is open after the compressor 4, 4a, 4b is turned off. A temperature range for determining whether the first branch 31, 31a, 31b is closed after the compressor 4, 4a, 4b is turned off may use any one in FIG. 6-1 to FIG. 6-3.

In another implementation, determining whether to open the second branch 32, 32a, 32b after the compressor 4, 4a, 4b is turned off based on the ambient temperature. When the ambient temperature is within the preset temperature range, the second branch 32, 32a, 32b is closed after the compressor 4, 4a, 4b is turned off. When the ambient temperature is outside of the preset temperature range, the second branch 32, 32a, 32b is open after the compressor 4, 4a, 4b. A temperature range for determining whether the second branch 32, 32a, 32b is closed after the compressor 4, 4a, 4b is turned off may use any one in FIG. 6-1 to FIG. 6-3.

According to different statuses of the first branch 31, 31a, 31b and the second branch 32, 32a, 32b, that the first branch 31, 31a, 31b and the second branch 32, 32a, 32b are closed after the compressor 4, 4a, 4b is turned off may include: switching from an open state before the compressor is turned off to a closed state or maintaining an existing closed state before the compressor is turned off to maintain pressure difference between a high pressure side and a low pressure side in the refrigeration system.

According to different statuses of the first branch 31, 31a, 31b and second branch 32, 32a, 32b, that the first branch 31, 31a, 31b and the second branch 32, 32a, 32b are open after the compressor 4, 4a, 4b is turned off may include: switching from a closed state before the compressor is turned off to an open state or maintaining an existing open state before the compressor is turned off to reduce pressure difference between the high pressure side and the low pressure side in the refrigeration system.

That the first branch 31, 31a, 31b and the second branch 32, 32a, 32b are closed after the compressor 4, 4a, 4b is turned off to maintain pressure difference between the high pressure side and the low pressure side in the refrigeration system may include that: the first branch 31, 31a, 31b and the second branch 32, 32a, 32b are continuously open in a period in which the compressor 4, 4a, 4b is turned off or are in a closed state in most time of this period to implement the objective of maintaining pressure difference between the high pressure side and the low pressure side in the refrigeration system.

That the first branch 31, 31a, 31b and the second branch 32, 32a, 32b are continuously closed in the period in which the compressor 4, 4a, 4b is turned off may be that since the compressor is turned off, the first branch 31, 31a, 31b and the second branch 32, 32a, 32b are closed immediately to maintain pressure difference between the high pressure side and the low pressure side in the refrigeration system. As a variant, the first branch 31, 31a, 31b and the second branch 32, 32a, 32b are in a closed state in most time of the period in which the compressor 4, 4a, 4b is turned off to maintain pressure difference between the high pressure side and the low pressure side in the refrigeration system, and in the period in which the compressor 4, 4a, 4b is turned off, the first branch 31, 31a, 31b and the second branch 32, 32a, 32b are transiently (for example, not longer than 2 minutes) in an open state so as not to obviously reduce pressure difference between the high pressure side and the low pressure side in the refrigeration system.

That the first branch 31, 31a, 31b and the second branch 32, 32a, 32b are open after the compressor 4, 4a, 4b is turned off may include that: in the period in which the compressor 4, 4a, 4b is turned off, the first branch 31, 31a, 31b and the second branch 32, 32a, 32b are continuously in an open state or in an open state in most time of the period to reduce pressure difference between the high pressure side and the low pressure side in the refrigeration system.

That the first branch 31, 31a, 31b and the second branch 32, 32a, 32b are continuously open in the period in which the compressor 4, 4a, 4b is turned off may be that since the compressor is turned off, the first branch 31, 31a, 31b and the second branch 32, 32a, 32b are open immediately to reduce pressure difference between the high pressure side and the low pressure side in the refrigeration system. As a variant, the first branch 31, 31a, 31b and the second branch 32, 32a, 32b are in an open state in most time of the period in which the compressor 4, 4a, 4b is turned off to reduce pressure difference between the high pressure side and the low pressure side in the refrigeration system. For example, in the period in which the compressor 4, 4a, 4b is turned off, the first branch 31, 31a, 31b and the second branch 32, 32a, 32b are transiently (for example, not longer than 10 minutes) in a closed state so as not to obviously affect a balance process of pressure difference between the high pressure side and the low pressure side in the refrigeration system.

In the foregoing embodiments, the principle of the present invention is described by using a refrigeration system including two refrigeration cycles as an example. It should be understood that, the principle of the present invention may alternatively be applicable to a refrigeration system including more refrigeration cycles/branches. For example, the principle of the present invention may alternatively be applicable to a three-cycle refrigeration system including three branches connected in parallel at inlets thereof.

In addition, in the foregoing embodiments, when the compressor is running, both the first branch and the second branch may be open to enable both the first evaporator and the second evaporator to be supplied with a refrigerant. However, the principle of the present invention may similarly be applicable to a refrigeration system in which a refrigerant is supplied to the first branch and the second branch in a switching manner.

Although the refrigeration appliance and the method for a refrigeration appliance are described above based on a specific shape and direction with reference to the accompanying drawings, a person skilled in the art may be aware that, variations may be made without departing from the principle and spirit of the present disclosure. In other words, although exemplary implementations are shown and described, a person skilled in the art may be aware that, variations may be made to these implementations without departing from the principle and spirit of the present disclosure, and the scope of the present disclosure is as defined by the appended claims and their equivalents.

The invention claimed is:

1. A cooling appliance, comprising:
a compressor;
a plurality of branches connected in parallel at inlets thereof, wherein each of said branches having a corresponding evaporator;
a fluid controller, configured to selectively open at least one of said branches, so that when said compressor is running, said corresponding evaporator in an opened branch of said branches is supplied with a refrigerant output from said compressor; and
a controller configured to determine, based on an ambient temperature, whether at least one of said branches is open or should be opened after said compressor is turned off, wherein when the ambient temperature is within a first ambient temperature range, at least one of said branches is closed after a turning-off of said compressor, and when the ambient temperature is outside of the first ambient temperature range, said at least one branch is open after a turning-off of said compressor, wherein the first ambient temperature range includes a lower limit less than 15 degrees Celsius and an upper limit greater than 20 degrees Celsius.

2. The cooling appliance according to claim 1, wherein said branches include a first branch, and said controller is configured to determine based on the ambient temperature whether said first branch is open after closing a turning-off of said compressor.

3. The cooling appliance according to claim 1, wherein said branches include a second branch, and said controller is configured to determine based on the ambient temperature whether said second branch is open after a turning-off of said compressor.

4. The cooling appliance according to claim 1, wherein said controller is configured to determine based on the ambient temperature whether all said branches are open after a turning-off of said compressor.

5. A cooling appliance, comprising:
a compressor;
a first branch having a first evaporator and a first inlet;
a second branch having a second evaporator and a second inlet, said first inlet of said first branch and said second inlet of said second branch are connected in parallel, wherein when said compressor is running and said first branch is open, said first evaporator is supplied with a refrigerant output from said compressor, and when said compressor is running and said second branch is open, said second evaporator is supplied with the refrigerant output from said compressor; and
a controller coupled to said compressor, said controller configured to determine, based on an ambient temperature, whether said first branch is open or should be opened after said compressor is turned off, and/or said controller is configured to determine, based on the ambient temperature, whether said second branch is open or should be opened after said compressor is turned off, and wherein when the ambient temperature is within a first ambient temperature range, said first branch is closed after a turning-off of said compressor, and when the ambient temperature is outside of the first ambient temperature range, said first branch is open after a turning-off of said compressor, wherein the first ambient temperature range includes a lower limit less than 15 degrees Celsius and an upper limit greater than 20 degrees Celsius.

6. The cooling appliance according to claim 5, wherein when the ambient temperature is within a second ambient temperature range, said second branch is closed after a turning-off of said compressor, and when the ambient temperature is outside of the second ambient temperature range, said second branch is open after a turning-off of said compressor.

7. The cooling appliance according to claim 6, wherein the second ambient temperature range includes a lower limit less than 20 degrees Celsius or an upper limit greater than 20 degrees Celsius.

8. The cooling appliance according to claim 7, further comprising a first storage room;
further comprising a second storage room;
wherein said first evaporator is configured to cool said first storage room that is a freezer; and
wherein said second evaporator is configured to cool said second storage room that contains a non-freezing temperature zone, and the first ambient temperature range in which said first branch is closed after said compressor is turned off is wider than or equal to the second ambient temperature range in which said second branch is closed after said compressor is turned off.

9. The cooling appliance according to claim 8, wherein the second ambient temperature range is within the first ambient temperature range.

10. The cooling appliance according to claim 8, wherein:
when the ambient temperature is less than 20 degrees centigrade, if the ambient temperature is less than the lower limit of the first ambient temperature range, said first branch is open after said compressor is turned off, and if the ambient temperature is less than the lower limit of the second ambient temperature range, said second branch is open after said compressor is turned off, wherein the lower limit of the first ambient temperature range is less than or equal to the lower limit of the second ambient temperature range; and/or
when the ambient temperature is greater than 20 degrees centigrade, if the ambient temperature is greater than the upper limit of the first ambient temperature range, said first branch is open after the compressor is turned off, and if the ambient temperature is greater than the upper limit of the second ambient temperature range, said second branch is open after said compressor is turned off, wherein the upper limit of the first ambient temperature range is greater than or equal to the upper limit of the second ambient temperature range.

11. The cooling appliance according to claim 5, further comprising:
a first valve disposed between said first inlet of said first branch and said first evaporator; and
a second valve disposed between said second inlet of said second branch and said second evaporator.

12. The cooling appliance according to claim 5, further comprising a rotary valve having a first outlet coupled to said first branch and a second output coupled to said second branch.

* * * * *